United States Patent
Elfizy (10) Patent No.: US 8,362,392 B2
(45) Date of Patent: Jan. 29, 2013

(54) METHOD FOR DRILLING HOLES ACCORDING TO AN OPTIMIZED SEQUENCE

(75) Inventor: Amr Elfizy, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1213 days.

(21) Appl. No.: 12/026,152

(22) Filed: Feb. 5, 2008

(65) Prior Publication Data
US 2009/0196699 A1    Aug. 6, 2009

(51) Int. Cl.
*B23K 26/00* (2006.01)

(52) U.S. Cl. ........... 219/121.71; 219/121.67; 219/121.7; 219/121.72; 700/166; 700/173

(58) Field of Classification Search ............... 219/121.6, 219/121.67–121.72, 121.79; 700/173, 159, 700/160, 162, 166, 182; 408/1 R, 3
See application file for complete search history.

(56) References Cited

U.S. PATENT DOCUMENTS

| | | | |
|---|---|---|---|
| 4,855,565 A | 8/1989 | Thomas et al. | |
| 4,952,789 A | 8/1990 | Suttie | |
| 5,037,183 A | 8/1991 | Gagosz et al. | |
| 5,216,808 A * | 6/1993 | Martus et al. | 29/889.1 |
| 5,223,692 A | 6/1993 | Lozier et al. | |
| 5,239,160 A | 8/1993 | Sakura et al. | |
| 5,279,176 A | 1/1994 | Tahmasebi et al. | |
| 5,293,025 A * | 3/1994 | Wang | 219/121.71 |
| 5,376,061 A | 12/1994 | Suzuik | |
| 5,916,462 A | 6/1999 | James et al. | |
| 6,032,361 A | 3/2000 | Makino et al. | |
| 6,034,349 A | 3/2000 | Ota | |
| 6,040,553 A * | 3/2000 | Ross | 219/121.71 |
| 6,128,546 A * | 10/2000 | Basista et al. | 700/166 |
| 6,130,405 A | 10/2000 | Loringer | |
| 6,167,607 B1 * | 1/2001 | Pryor | 29/407.04 |
| 6,433,303 B1 | 8/2002 | Liu et al. | |
| 6,462,301 B1 | 10/2002 | Scott et al. | |
| 6,526,327 B2 * | 2/2003 | Kar et al. | 700/119 |
| 6,541,732 B2 | 4/2003 | Hirose et al. | |
| 6,581,437 B2 | 6/2003 | Chrystall et al. | |
| 6,627,844 B2 * | 9/2003 | Liu et al. | 219/121.71 |
| 6,648,583 B1 | 11/2003 | Roy et al. | |
| 6,649,864 B2 | 11/2003 | De Steur et al. | |
| 6,655,247 B1 | 12/2003 | Walker et al. | |

(Continued)

FOREIGN PATENT DOCUMENTS

| EP | 0 339 888 | 11/1989 |
|---|---|---|
| EP | 0 486 133 | 5/1992 |

(Continued)

OTHER PUBLICATIONS

EP09250290 Search Report of Jun. 2, 2009, Pratt & Whitney Canada Corp.

(Continued)

*Primary Examiner* — Henry Yuen
*Assistant Examiner* — John Wasaff
(74) *Attorney, Agent, or Firm* — Norton Rose Canada LLP (57) ABSTRACT

A method for drilling holes in a component according to an optimized sequence is provided. The sequence is determined so as to minimize a total displacement of all axes of a hole drilling machine that is required for moving between each hole in the sequence.

16 Claims, 5 Drawing Sheets

U.S. PATENT DOCUMENTS

| | | |
|---|---|---|
| 6,664,499 B1 * | 12/2003 | Brink et al. .............. 219/121.67 |
| 6,734,390 B1 | 5/2004 | Frye |
| 6,738,691 B1 | 5/2004 | Colgate et al. |
| 6,769,194 B2 | 8/2004 | Hennessey |
| 6,808,344 B2 | 10/2004 | Chen |
| 6,858,814 B2 | 2/2005 | Fischer et al. |
| 6,871,548 B2 | 3/2005 | Helmer et al. |
| 7,062,845 B2 | 6/2006 | Burgess |
| 7,105,956 B2 | 9/2006 | Botos et al. |
| 2004/0164060 A1 | 8/2004 | Maeda et al. |
| 2004/0194569 A1 | 10/2004 | Hermoso |

FOREIGN PATENT DOCUMENTS

| | | |
|---|---|---|
| JP | 7-32183 A | 2/1995 |
| JP | 10-137960 A | 5/1998 |
| JP | 2005-169481 A | 6/2005 |
| WO | WO 00/15383 | 3/2000 |

OTHER PUBLICATIONS

Christian Wurll & Dominik Henrich: "Point-to-Point and Multi-Goal Path Planning for Industrial Robots", Journal of Robotic Systems, vol. 18, No. 8, Aug. 1, 2001, pp. 445-461.

* cited by examiner

METHOD FOR DRILLING HOLES ACCORDING TO AN OPTIMIZED SEQUENCE

TECHNICAL FIELD

The invention relates generally to drilling holes in components and, more particularly, to an improved method for drilling holes.

BACKGROUND OF THE ART

Heat shield panels and combustion chamber liners used in gas turbine engines usually have hundreds of effusion holes distributed in a non-symmetrical pattern and having varying directional vectors. Current methods for drilling such hole patterns include the use of conventional CAD/CAM systems and pulsed laser drilling machines having five axes of motion.

Conventional CAD/CAM systems are typically used to determine a hole drilling sequence for hole patterns based on the shortest distance between the entry point of each hole. CAD/CAM systems do not take into account the directional vector of each hole and also do not consider the kinematics of the multi-axis drilling machine during sequencing. Therefore, the drilling sequence may not be truly optimized. For example, even though the distance between the entry points of two holes within a hole pattern may be short, the fact that they have different directional vectors may result in relatively large displacements required by some axes of the drilling machine. Depending on the configuration of the drilling machine, this can lead to relatively long, irregular and unpredictable travel times between holes of the hole pattern. Further, the time required for the axes to travel between two consecutive holes can be longer than the interval between two consecutives pulses of the laser. Therefore, depending on the firing frequency of the laser, the shutter may have to be closed and re-opened between consecutive holes in the sequence. Evidently, this can lead to an unduly long cycle time for drilling the hole pattern.

Accordingly, there is a need to provide a method for drilling holes from a hole pattern in reduced time.

SUMMARY

It is therefore an object of the present invention to provide a drilling method which addresses the above mentioned concerns.

According to one broad aspect there is provided a method for drilling holes in a component using a hole drilling machine, the hole drilling machine having a plurality of axes wherein at least one axis is a rotary axis, the method comprising the steps of: a) providing a hole pattern comprising a plurality of holes with respective locations and directional vectors; b) determining a drilling sequence for the hole pattern based on the location and directional vector of each hole, and a configuration of the hole drilling machine so as to minimize a total displacement in all axes required for moving between each hole; and c) drilling the holes according to the drilling sequence.

According to another aspect, there is provided a method for drilling holes in a component using a multi-axis hole drilling machine, the method comprising the steps of: a) providing a hole pattern comprising a plurality of holes with respective locations and directional vectors b) based on the location and directional vector of each hole, and, kinematics of the multi hole drilling machine, determining a drilling sequence for the hole pattern so as to minimize a total displacement in all axes required for moving between consecutive holes; and c) drilling the holes using the multi-axis hole drilling machine according to the drilling sequence.

According to a further aspect, there is provided a system for drilling a plurality of holes in a component in accordance to an optimized sequence, the system comprising: a hole drilling machine having a plurality of axes wherein at least one axis is a rotary axis; a controller in communication with the hole drilling machine and; a hole sequencing means which provides instructions to the controller for instructing the hole drilling machine to drill the holes according to an optimized sequence, the drilling sequence being determined by the hole sequencing means based on a location and directional vector of each hole, and, a configuration of the axes of the hole drilling machine so as to minimize a total displacement in all axes required for moving between consecutive holes.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
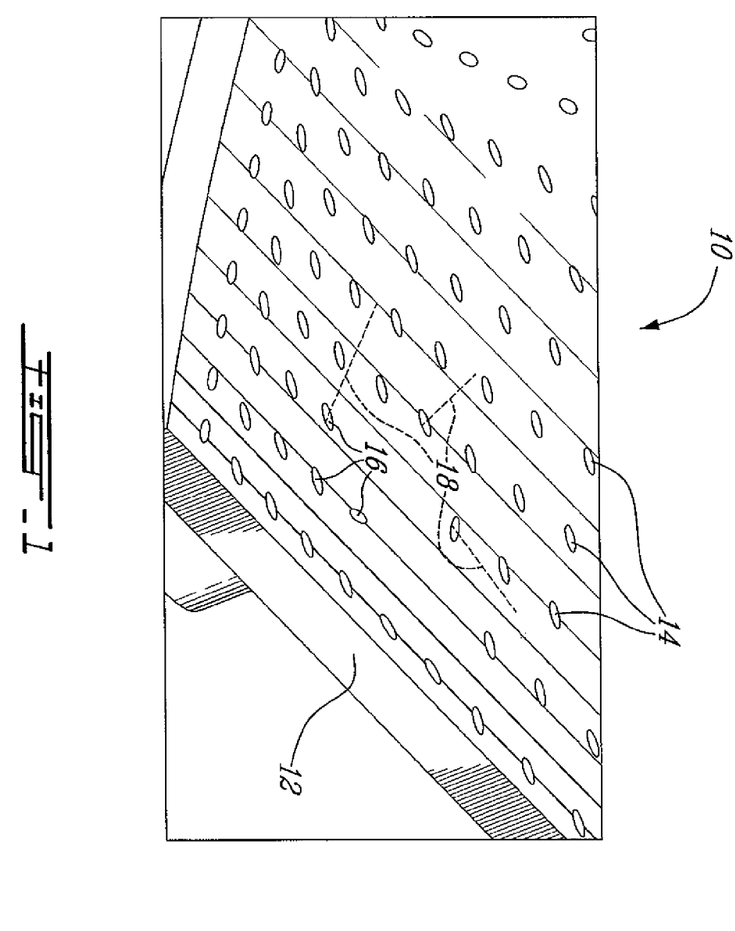
FIG. 1 is a partial isometric view of a component comprising a plurality of holes with respective directional vectors.

Referring now to FIG. 1, a part, generally shown at 10, is shown having a wall 12 comprising a plurality of holes 14 formed therethrough. The holes 14 are distributed on the wall 12 according to a non-symmetrical hole pattern. Each hole 14 has a respective location 16 and directional vector 18. The locations 16 define coordinates of respective entry points for the holes 14. The directional vectors 18 represent axes along which respective holes 14 extend. As illustrated in FIG. 1, the directional vectors 18 may vary from one hole 14 to another. Such hole patterns are used, for example, for effusion cooling in heat shield panels and combustion chamber liners of gas turbine engines.

Figure 2:
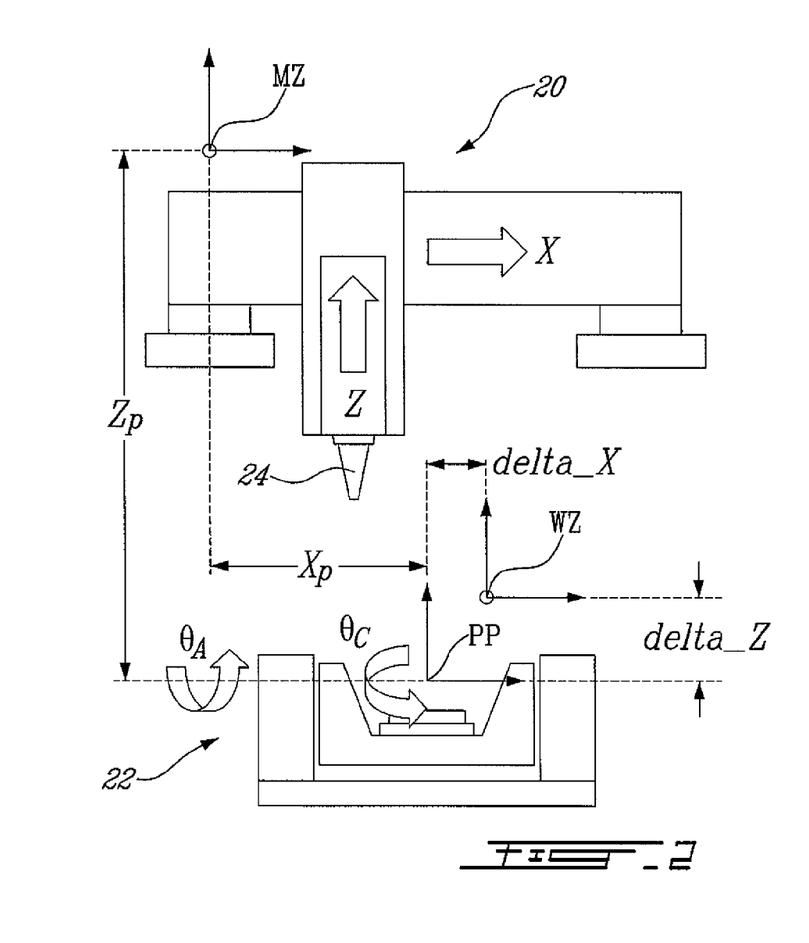
FIG. 2 is schematic front elevation view of a five-axis motion system.
Figure 3:
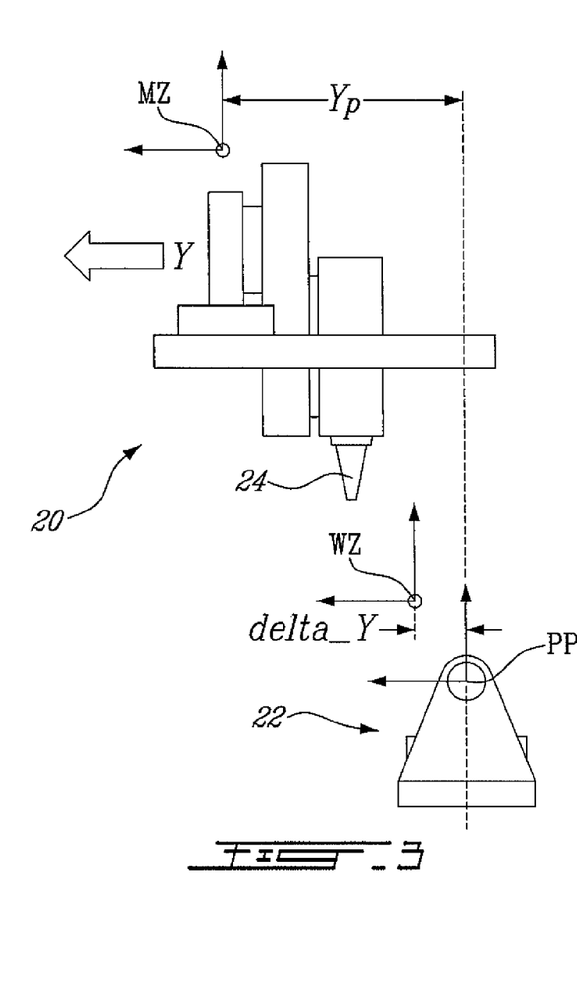
FIG. 3 is a schematic side elevation view of the five-axis motion system of FIG. 2.

Such hole patterns are typically formed using multi-axis drilling machines which comprise a conventional motion system as shown in FIGS. 2 and 3. FIGS. 2 and 3 illustrate a schematic representation of a motion system, generally shown at 20, which comprises five axes of motion and has a conventional trunnion table generally shown at 22. The motion system 20 comprises three orthogonal linear axes shown as X, Y and Z, and, two rotary axes shown as $\theta A$ and $\theta C$. Movement about the axes $\theta A$ and $\theta C$ is achieved using the trunnion table 22. The drilling machine may also comprise a pulsed laser system (not shown) or other suitable means for producing the holes 14 in the part 10. Laser pulses are delivered via a laser head 24 mounted on the motion system 20. The motion system 20 and optionally the laser system may be controlled by a conventional Computer Numerical Control (CNC) motion controller (not shown).

The setup of the motion system 20 shown in FIGS. 2 and 3 includes a machine zero (machine coordinate system) MZ, a workpiece zero (workpiece coordinate system) WZ and a pivot point PP of the trunnion table 22. Offsets between the machine zero MZ and the pivot point PP are labelled as Xp along the X axis, Yp along the Y axis and Zp along the Z axis. Offsets between the workpiece zero WZ and the pivot point PP are labelled as delta_X along the X axis, delta_Y along the Y axis and delta_Z along the Z axis.

Typical part programming includes planning the process and the trajectory that will be executed by the motion system 20. This is typically done by a programmer/planner using a conventional CAD/CAM system. Once the part programming is done, a post-processor is used to produce a part program that is subsequently read by the controller and executed by the drilling machine. The post-processor takes into consideration the configuration of the motion system 20 and formatting requirements of the controller in order to produce a suitable part program to execute the process. The part program may be in the form of conventional G-codes tailored specifically for the motion system 20 and controller combination.

When using percussion laser drilling, the holes 14 are typically drilled along their respective directional vector 18 using one or more laser pulses. Drilling sequences of large hole patterns that are determined using conventional CAD/CAM systems only take into account the distance between the location 16 of each hole 14. The directional vector 18 of each hole 14 and the configuration of the motion system 20 are not considered by conventional CAD/CAM systems until the post-processing step. Consequently, even though the distance between the location 16 of two holes 18 may be short, the required displacement of all axes (X, Y, Z, θA and θC) may be relatively large. For example, the configuration of the motion system 20 is such that the rotary axis θA is parallel to the X axis and the workpiece zero WZ is above the pivot point PP. Accordingly, the delta_Z offset represents a swing distance where as the part is rotated about the θA axis to accommodate a particular directional vector 18, a corresponding translation of the laser head 24 or part 10 along the Y axis is required in order to drill the particular hole 14 at the correct location 16. One skilled in the art would recognize that displacements in all five axes may be required depending on the locations 16 and directional vectors 18 of the holes 14 and that precautions should be taken to avoid collisions between the laser head 24 and the part 10 or the trunnion table 22.

The displacement of each axis and therefore the travel time between holes 14 having differing directional vectors 18 is not known or controlled during the part planning stage and can vary greatly throughout the drilling sequence. This leads to irregular and unpredictable travel times between holes 14. Accordingly, the drilling sequence is not optimized to reduce the total cycle time and cannot be used for drilling on-the-fly. During drilling on-the-fly, delays caused by closing and re-opening a shutter of the laser system are avoided by moving between holes 14 during an interval between consecutive pulses while the laser is continuously firing at a predetermined frequency and while the shutter remains open.

Figure 4:
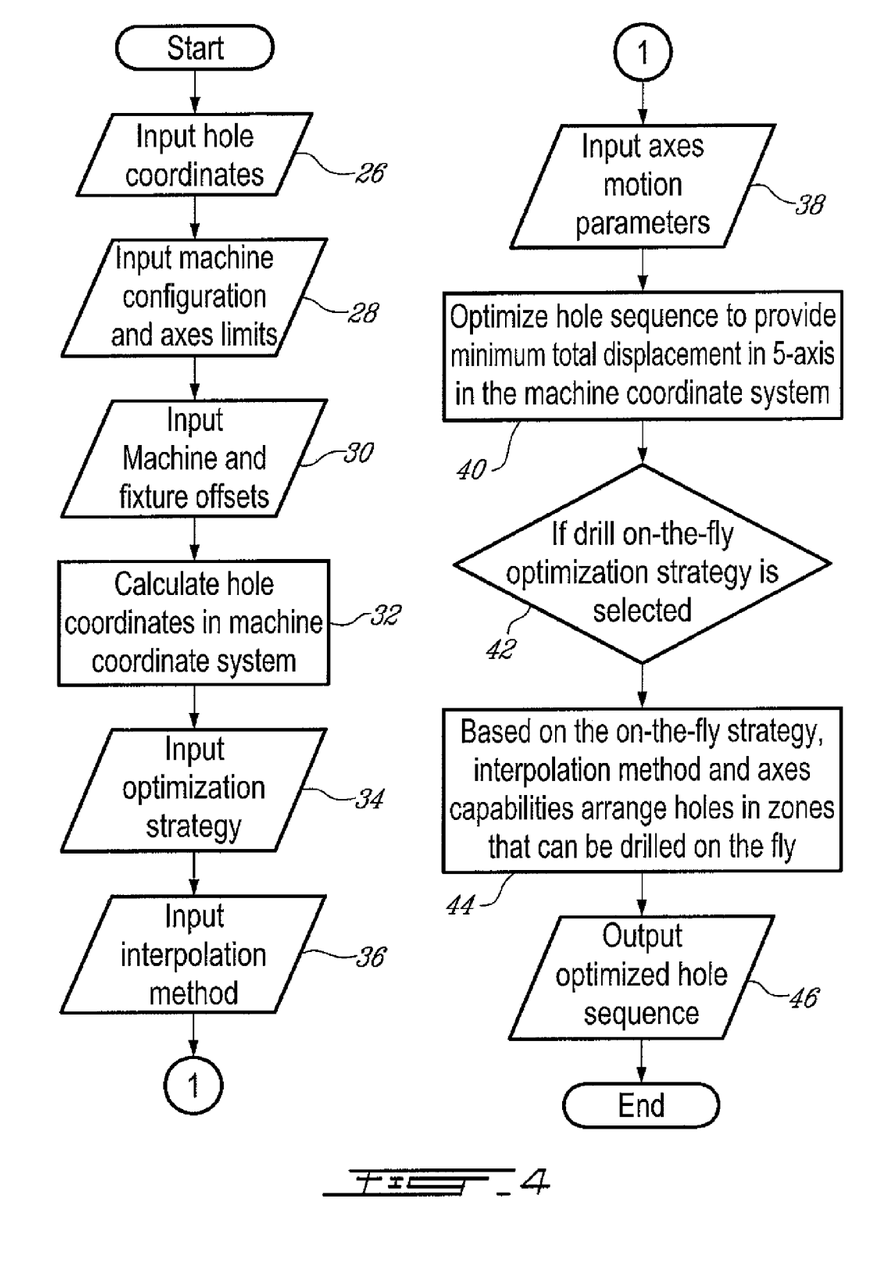
FIG. 4 is a flowchart showing steps of a method used to generate a hole drilling sequence.

FIG. 4 illustrates the steps of a method for drilling holes 14 in a component according to an optimized sequence using a multi-axis hole drilling machine. The drilling sequence is optimized to reduce the total cycle time based on the locations 16 and directional vectors 18 of the holes 14 to be drilled, and, on the configuration including kinematics of the hole drilling machine. Firstly, a hole pattern is provided and comprises a plurality of holes 14 with respective locations 16 and directional vectors 18. A drilling sequence is then determined for the hole pattern based on the location 16 and directional vector 18 of each hole 14, and, a configuration of the hole drilling machine so as to minimize a total displacement in all axes required for moving between each hole 14. The holes 14 are then drilled using the hole drilling machine according to the optimized drilling sequence. Optionally, the drilling sequence may be used with drilling on-the-fly techniques.

As shown in FIG. 4, steps 26, 28 and 30 of the method specifically comprise gathering information about the hole pattern and the hole drilling machine. Step 26 comprises gathering information about the hole pattern such as the number of holes 14, their respective locations 16 and their respective directional vectors 18. Step 28 comprises gathering information about the configuration of the laser drilling machine such as the number, type and relationship of the of axes, and, their respective limits. Step 30 comprises gathering information relating to the machine zero MZ, pivot point PP and workpiece zero WZ, and, the corresponding offsets Xp, Yp, Zp, delta_X, delta_Y and delta_Z. Based on the information gathered above, the coordinates of each hole 14 are calculated in step 32 in machine coordinates in terms of the position of each axis required for drilling each hole 14.

In step 34, an optimization strategy is chosen. The optimization strategy is selected based on the capabilities of the drilling machine and the hole pattern. The optimization strategy may include, for example, "point-to-point shortest route", "point-to-point on-the-fly" or "smooth trajectory on-the-fly".

In the "point-to-point shortest route" the drilling sequence is determined so as to minimize the total displacement of all axes X, Y, Z, θA and θC that is required to move between each consecutive hole 14 as shown by equation (a) below:

$$\text{total displacement of axes} = \sqrt{dX^2 + dY^2 + dZ^2 + d\theta A^2 + d\theta C^2} \quad (a)$$

wherein dX, dY, dZ, dθA and dθC are the respective displacements along axes X, Y, Z, θA and θC that are required to move between two consecutive holes 14. Using this strategy, the drilling machine moves to a hole 14, the shutter opens, the hole 14 is drilled by firing a required number of pulses, the shutter closes and the drilling machine moves to a next hole 14 to repeat the process.

Based on the hole pattern that is provided, the optimized drilling sequence may be determined by first selecting a first hole from the hole pattern and determining a first position of each axis required for drilling the first hole. A next hole is then selected from the hole pattern where the total displacement in all axes X, Y, Z, θA and θC, required to move from the first position of each axis to a next position of each axis for drilling the next hole, is shortest. In order to complete the sequence, the above step is repeated until all of the holes 14 in the pattern have been included in the sequence, while replacing the first position of each axis with the next position of each axis.

The "point-to-point on-the-fly" strategy also utilizes the "point-to-point shortest route" strategy but further makes use on-the-fly laser drilling where the movement between consecutive holes occurs during an interval between two consecutive pulses while the laser system is continuously firing and a shutter of the laser system remains open. Using this strategy, no time is wasted to repeatedly close and re-open the shutter for drilling each hole 14.

The "smooth trajectory on-the-fly" strategy utilizes the "point-to-point on-the-fly" strategy but does not allow the motion system 20 to stop to drill each hole 14. The movement between consecutive holes 14 is continuous while the laser system delivers a single pulse to each hole 14. The drilling sequence may be repeated in order to deliver a required number of pulses to each hole 14. In order to make use of this drilling strategy, the motion system 20 should have a relatively high repeatability since the drilling machine must repeatedly return to the exact location of each hole 14 in order to deliver the required number pulses. Again, no time is wasted to close and re-open the shutter, and advantageously, no time is wasted to repeatedly accelerate and decelerate for moving between, each hole 14. Accordingly, the total cycle time required to drill a hole pattern can be reduced significantly.

In steps 36 and 38, interpolation methods and motion parameters are selected and gathered respectively. Interpolation methods determines machine acceleration profile. They may also include secondary order trajectory, third order trajectory or fourth order trajectory. Trajectory profiles are used for feed rate generation. Motion parameters may include for example acceleration/deceleration rates and the maximum velocity of each axis.

In step 40, an optimized hole drilling sequence is determined according to the "point-to-point shortest route" strategy based on the information provided. If one of the on-the-fly optimization strategy is selected, and, based on the capabilities of the drilling machine, the drilling sequence may optionally (step 42) be arranged into a plurality of zones that may be drilled on-the-fly (step 44). Depending on the capabilities of the drilling machine and firing frequency of the laser system, not all of the holes 14 in a pattern may be drilled on-the-fly in one instance as some holes 14 may require a too large displacement of the axes. In such cases the holes 14 are grouped into sequential zones where the holes 14 within each zone are drilled on-the-fly and the shutter is only closed and re-opened between zones.

Once the optimized drilling sequence is determined, it is output in step 46 and communicated to the controller. The controller provides instructions to the multi-axis drilling system so as to drill the holes 14 in the part 10 according to the optimized sequence. The drilling sequence may be communicated to the controller in the form of a part program containing properly formatted G-codes.

Figure 5:
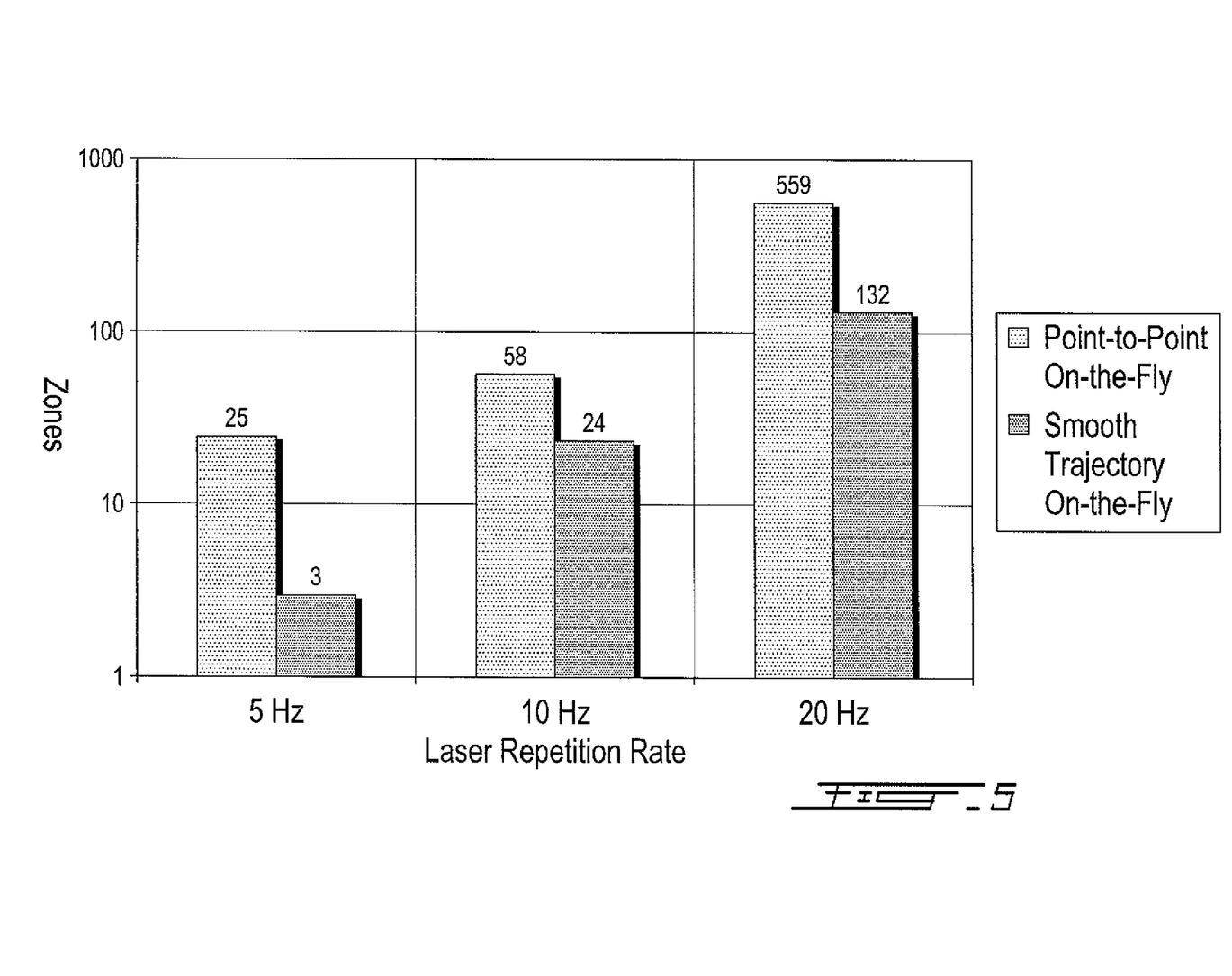
FIG. 5 is a graph comparing a number of zones present in an exemplary hole drilling sequence generated using the method of FIG. 4 in relation to a drilling strategy and laser firing frequency.

The graph shown FIG. 5 illustrates the effects of the laser repetition or firing frequency (Hz) and of the on-the-fly drilling strategy selected on the number of zones that must be defined in a drilling sequence. The information displayed in FIG. 5 stems from a typical exemplary hole pattern to be drilled in a heat shield using, for instance, a Mitsui Seiki VL30-5X motion system with relatively high acceleration/deceleration rates. A lower firing frequency of the laser provides a longer interval between adjacent pulses and therefore allows the axes of the motion system 20 to travel a greater distance between consecutive pulses without having to close and re-open the shutter. As a result, the holes 14 may be grouped into fewer zones and more holes 14 may be drilled continuously on-the-fly as shown in FIG. 5. However, the reduced firing frequency may also increase the cycle time. Therefore, a suitable compromise between the firing frequency and corresponding number of zones should be selected to minimize the cycle time. The amount of time required for closing and re-opening the shutter should be considered in selecting a suitable firing frequency.

The number of zones required in the drilling sequence is also dependent on the drilling strategy selected. The graph in FIG. 5 shows that the "smooth trajectory on-the-fly" strategy requires fewer zones than the "point-to-point on-the-fly" strategy. This is due to the fact that in the "smooth trajectory on-the-fly" strategy no time is wasted for accelerating and decelerating between each hole 14 as the movement is continuous. As a result, a greater distance may be travelled between consecutive pulses and more holes 14 may be drilled continuously on-the-fly.

Figure 6:
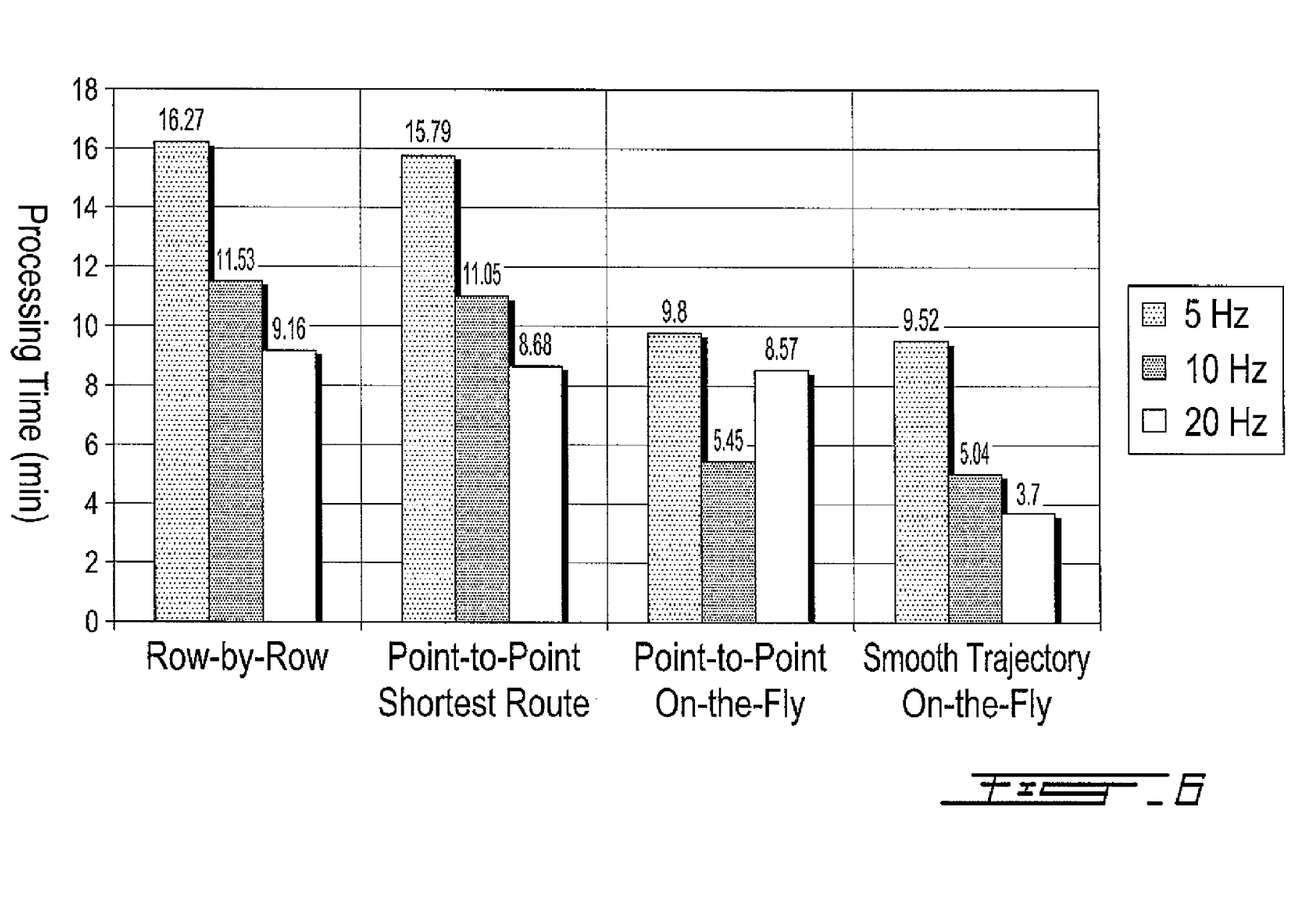
FIG. 6 is a graph comparing the processing time for drilling the exemplary hole pattern of FIG. 5, according to an exemplary hole drilling sequence generated using the method of FIG. 4, in relation to a drilling strategy and laser firing frequency.

The graph shown in FIG. 6 displays information that stems from the same exemplary hole pattern as in FIG. 5. FIG. 6 illustrates the effects of the firing frequency and of the drilling strategy on the processing or cycle time. As a base line, data is provided for a "row-by-row" drilling strategy. The optimized "point-to-point shortest route" strategy provides a slight improvement over the "row-by-row" while the two on-the-fly strategies provide a significant reduction in cycle time in comparison with the base line data. Except for the "point-to-point on-the-fly" strategy, the effects of the firing rate for this particular example are that a higher firing frequency in the range of 5 Hz to 20 Hz results in a shorter cycle time. The data for the "point-to-point on-the-fly" shows that a compromise between the firing frequency and corresponding number of zones should be selected to minimize the cycle time as the cycle time using a 10 Hz firing frequency is considerably lower than the cycle time using a 20 Hz firing frequency.

The above method may be implemented in the form of a software module either stand alone, integrated within a conventional CAD/CAM system or integrated as part of the controller of the drilling machine. The software module may also be part of a hole drilling system which includes the hole drilling machine. The software module serves as a hole sequencing means which communicates instructions to the controller. The controller then controls the motion system 20 and optionally the pulsed laser system for drilling the holes in accordance with the optimized sequence.

The specific layout or configuration of the motion system 20 is well-known and it is apparent that other configurations of five-axis motion systems such as "double rotary head" or "trunnion on X-Y table" may also be used. It is also apparent to one skilled in the art that depending on the size and geometry of the components, and, the specific configuration of the holes 14 to be drilled, other configuration of motions systems 20 may also be suitable. Five axes of motion may not necessarily be required and the number and type of axes (linear or rotary) may be selected based on the specific application. The method may also be used in conjunction with motion systems having a configuration where the relative locations 16 of the entry points of each hole 14 are not directly representative of the movement of each axis required for moving to each hole 14. For example the three-dimensional distance between two holes 14 may not be representative of the required axis displacement in cases where a combination of linear and rotary displacements is required. Therefore, such motion system configurations may also include systems having a plurality of axes where only one of the axes is a rotary axis.

The above description is meant to be exemplary only, and one skilled in the art will recognize that changes may be made to the embodiments described without departing from the scope of the invention disclosed. For example, the hole drilling method described above uses percussion drilling using a pulsed laser system however other laser drilling techniques such as trepanning may also be used. In addition, other machining or material removal processes for drilling or forming holes such as cutting, conventional drilling, electrical discharge machining (EDM) and the like could also be used and benefit from the optimized sequencing provided by the above method. Still other modifications which fall within the scope of the present invention will be apparent to those skilled in the art, in light of a review of this disclosure, and such modifications are intended to fall within the appended claims.

What is claimed is:

1. A method for drilling holes in a component using a hole drilling machine, the hole drilling machine having a plurality of machine axes wherein at least one axis is a rotary axis, the method comprising the steps of:
   a) providing a hole pattern comprising a plurality of holes with respective locations and directional vectors, the directional vectors defining axes along which the holes extend;
   b) determining a drilling sequence for the hole pattern based on the location and directional vector of each hole and on a configuration of the hole drilling machine so as to minimize a total displacement in all machine axes required for moving between each hole, by:
      i) calculating a position of each machine axis required for drilling each hole,
      ii) selecting a first one of the holes as a current hole;
      ii) selecting a next one of the holes among remaining ones of the holes corresponding to a shortest total displacement between the position of each machine axis for the current hole and the position of each machine axis for the next one of the holes, the total displacement between the position of each machine axis for the current hole and the position of each machine axis for the next one of the holes is calculated as $\sqrt{dX^2+dY^2+dZ^2+d\theta A^2+d\theta C^2}$, where dX, DY and dZ correspond to a linear displacement along a respective one of three near machine axes, and d$\theta$A and d$\theta$C correspond to a rotary displacement around a respective one of two rotary machine axes;
      iii) replacing the current hole with the next one of the holes; and
      iv) repeating step ii) and iii) until all holes are selected; and
   c) drilling the holes according to the drilling sequence.

2. The method as defined in claim 1, wherein the hole drilling machine comprises a pulsed laser system.

3. The method as defined in claim 2, wherein a movement between consecutive holes occurs during an interval between two consecutive pulses while the laser system is continuously firing and a shutter of the laser system is open.

4. The method as defined in claim 3, wherein the movement between consecutive holes is continuous while the laser system delivers a single pulse to each hole.

5. The method as defined in claim 4, wherein the drilling sequence is repeated to deliver a required number of pulses to each hole.

6. The method as defined in claim 2, further comprising grouping the holes of the sequence into a plurality of zones.

7. The method as defined in claim 6, wherein a movement between consecutive holes within individual zones occurs during an interval between two consecutive pulses while the laser system is continuously firing and a shutter of the laser system is open.

8. The method as defined in claim 7, wherein the movement between consecutive holes within individual zones is continuous while the laser system delivers a single pulse to each hole.

9. The method as defined in claim 8, wherein at least one zone of the sequence is repeated to deliver a required number of pulses to each hole within the at least one zone.

10. A method for drilling holes in a component using a multi-axis hole drilling machine having at least one rotary axis, the method comprising the steps of:
    a) providing a hole pattern comprising a plurality of holes with respective locations and directional vectors, the directional vectors defining axes along which the holes extend;
    b) based on the location and directional vector of each hole and kinematics of the multi-axis hole drilling machine, determining a drilling sequence for the hole pattern so as to minimize a total displacement in all axes of the drilling machine required for moving between consecutive holes by:
       i) calculating a position of each axis of the drilling machine required for drilling each hole,
       ii) selecting a first one of the holes as a current hole,
       iii) selecting a next one of the holes among remaining ones of the holes corresponding to a shortest total displacement between the position of each axis of the drilling machine for the current hole and the position of each axis of the drilling machine for the next one of the holes,
       iii) replacing the current hole with the next one of the holes, and
       iv) repeating steps ii) and iii) until all holes are selected; and
    c) drilling the holes using the multi-axis hole drilling machine according to the drilling sequence.

11. The method as defined in claim 10, wherein the hole drilling machine comprises a pulsed laser system.

12. The method as defined in claim 11, wherein a movement between consecutive holes occurs during an interval between two consecutive pulses while the laser system is continuously firing and a shutter of the laser system is open.

13. The method as defined in claim 12, wherein the movement between consecutive holes is continuous while the laser system delivers a single pulse to each hole.

14. The method as defined in claim 13, wherein the drilling sequence is repeated to deliver a required number of pulses to each hole.

15. The method as defined in claim 11, further comprising grouping the holes of the sequence into a plurality of zones.

16. The method as defined in claim 10, wherein the total displacement between the position of each axis of the drilling machine for the current hole and the position of each axis of the drilling machine for the next one of the holes is calculated as $\sqrt{dX^2+dY^2+dZ^2+d\theta A^2+d\theta C^2}$, where dX, DY and dZ correspond to a linear displacement along a respective one of three linear machine axes, and d$\theta$A and d$\theta$C correspond to a rotary displacement around a respective one of two rotary machine axes.

* * * * *